United States Patent
Walker et al.

(10) Patent No.: US 7,546,488 B2
(45) Date of Patent: Jun. 9, 2009

(54) EVENT LOGGING AND ANALYSIS IN A SOFTWARE SYSTEM

(75) Inventors: Michael D. Walker, Colorado Springs, CO (US); Robert S. Gittins, Woodland Park, CO (US); Robert C. Swindler, Jr., Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 626 days.

(21) Appl. No.: 10/884,312

(22) Filed: Jul. 2, 2004

(65) Prior Publication Data

US 2006/0005080 A1    Jan. 5, 2006

(51) Int. Cl.
  *G06F 11/00*    (2006.01)
(52) U.S. Cl. ........................................................ 714/38
(58) Field of Classification Search ............... 714/38, 714/39, 47, 51; 709/206, 217; 711/146
  See application file for complete search history.

(56) References Cited

U.S. PATENT DOCUMENTS

| | | | |
|---|---|---|---|
| 5,119,377 A * | 6/1992 | Cobb et al. ................... 714/38 |
| 5,297,258 A | 3/1994 | Hale et al. |
| 5,432,795 A * | 7/1995 | Robinson .................... 717/125 |
| 5,450,586 A * | 9/1995 | Kuzara et al. ............... 717/124 |
| 5,612,898 A * | 3/1997 | Huckins ..................... 709/224 |
| 5,638,514 A | 6/1997 | Yoshida et al. |
| 5,712,979 A | 1/1998 | Graber et al. |
| 5,745,686 A | 4/1998 | Saito et al. |
| 5,790,427 A | 8/1998 | Greer et al. |
| 5,835,955 A | 11/1998 | Dornier et al. |
| 5,912,669 A | 6/1999 | Hsia |
| 5,930,476 A | 7/1999 | Yamunachari et al. |
| 5,949,415 A | 9/1999 | Lin et al. |
| 5,949,976 A | 9/1999 | Chappelle |
| 5,966,705 A | 10/1999 | Koneru et al. |
| 5,996,054 A | 11/1999 | Ledain et al. |
| 6,041,423 A | 3/2000 | Tsukerman |
| 6,065,018 A | 5/2000 | Beier et al. |
| 6,125,392 A * | 9/2000 | Labatte et al. .............. 709/224 |
| 6,397,348 B1 | 5/2002 | Styczinski |

(Continued)

FOREIGN PATENT DOCUMENTS

EP    0913774 A3    5/2004

(Continued)

*Primary Examiner*—Nadeem Iqbal
(74) *Attorney, Agent, or Firm*—Fellers, Snider, et al.

(57) ABSTRACT

Method and apparatus for logging and analyzing event flows associated with execution of a service request in a software system, such as a computer-based system comprising a multi-disc data storage array. Execution of the service request results in a plurality of events carried out by multiple layers of the software system. A global event log accumulates a corresponding plurality of entries which associates each of the events carried out by the multiple layers. An event trace facility preferably accesses the global event log to provide a sequence of the entries corresponding to the service request, such as in a tree structure or time sequence order displayed by a graphical user interface. A log manager preferably controls operation of the global event log. Entries in the global event log are preferably entered sequentially for each ongoing process, and each entry preferably includes an identifier that identifies the associated service request.

16 Claims, 4 Drawing Sheets

U.S. PATENT DOCUMENTS

| | | |
|---|---|---|
| 6,418,445 B1 | 7/2002 | Moerbeek |
| 6,449,623 B1 | 9/2002 | Bohannon et al. |
| 6,477,617 B1 | 11/2002 | Golding |
| 6,493,837 B1 | 12/2002 | Pang et al. |
| 6,510,463 B1 | 1/2003 | Farhat et al. |
| 6,539,341 B1 | 3/2003 | Li et al. |
| 6,567,910 B2 | 5/2003 | Tessarolo et al. |
| 6,606,658 B1 | 8/2003 | Uematsu |
| 6,654,795 B1 | 11/2003 | Coile |
| 6,658,590 B1 | 12/2003 | Sicola et al. |
| 6,701,363 B1 | 3/2004 | Chiu et al. |
| 6,714,979 B1 | 3/2004 | Brandt et al. |
| 6,725,392 B1 | 4/2004 | Frey et al. |
| 6,732,293 B1 | 5/2004 | Schneider |
| 6,742,030 B1 | 5/2004 | MacPhail |
| 6,751,636 B1 | 6/2004 | Mende, Jr. et al. |
| 7,089,250 B2 * | 8/2006 | Doganata et al. ............ 707/100 |
| 2002/0016843 A1 | 2/2002 | Schweitzer et al. |
| 2002/0059380 A1 * | 5/2002 | Biliris et al. ................ 709/206 |
| 2003/0056199 A1 | 3/2003 | Li et al. |
| 2003/0056200 A1 | 3/2003 | Li et al. |
| 2003/0149743 A1 * | 8/2003 | Baluja et al. ................ 709/217 |
| 2004/0064639 A1 | 4/2004 | Sicola et al. |

FOREIGN PATENT DOCUMENTS

| | | |
|---|---|---|
| WO | WO 00/55953 A1 | 9/2000 |

* cited by examiner

RESOURCE INDEX STACK

GLOBAL DATA LOG

PROCESS (1)
(PROCESS (1), EVENT (1))
PROCESS (2)
(PROCESS (2), EVENT (1))
(PROCESS (1), LINK (1))
(PROCESS (2), EVENT (2))
PROCESS (3)
(PROCESS (1), EVENT (2))
(PROCESS (1), DELINK (1))
(PROCESS (3), EVENT (1))

HCR₁ (WORK INSTRUCTION, LOWER LEVEL RESOURCE)

EVENT LOGGING AND ANALYSIS IN A SOFTWARE SYSTEM

FIELD OF THE INVENTION

The claimed invention relates generally to the field of computer software and more particularly, but not by way of limitation, to an apparatus and method for logging and analyzing event flows associated with execution of a service request in a software system.

BACKGROUND

Computer-based systems enable a wide variety of data processing tasks to be accomplished in a fast and efficient manner. From hand-held consumer products to geographically distributed wide area networks with multi-device data storage arrays, such systems continue to increasingly pervade all areas of society and commerce.

Software is provided to direct the operation of such systems. Software (including firmware) can take a number of forms such as application programs, operating systems, interface and controller routines, and maintenance and housekeeping modules.

Each time a process is initiated by the software, a number of additional processes, handshakes, links, calculations, and other events can be carried out by the various layers of software in order to service and complete the service request. Generally, with increased complexity in the overall software system, including additional layers of software applications and operating systems, distributed processing and fault tolerant redundancy, it becomes increasingly difficult to assess the extent to which system resources are utilized to carry out a given process.

SUMMARY OF THE INVENTION

Accordingly, preferred embodiments of the present invention are generally directed to a method and an apparatus for logging and analyzing event flows associated with execution of a service request in a software system, such as a computer-based system comprising a multi-disc data storage array.

Execution of the service request preferably results in a plurality of events carried out by multiple layers of the software system. A global event log accumulates a corresponding plurality of entries to associate each of the events carried out by the respective layers.

An event trace facility preferably accesses the global event log to provide a sequence of the entries corresponding to the service request, such as in a tree structure or a time sequential order displayed by a graphical user interface. A log manager preferably controls operation of the global event log.

Entries in the global event log are preferably entered sequentially for each ongoing process, and each entry preferably includes an identifier that identifies the associated service request.

These and various other features and advantages which characterize the claimed invention will become apparent upon reading the following detailed description and upon reviewing the associated drawings.

DETAILED DESCRIPTION

Figure 1:
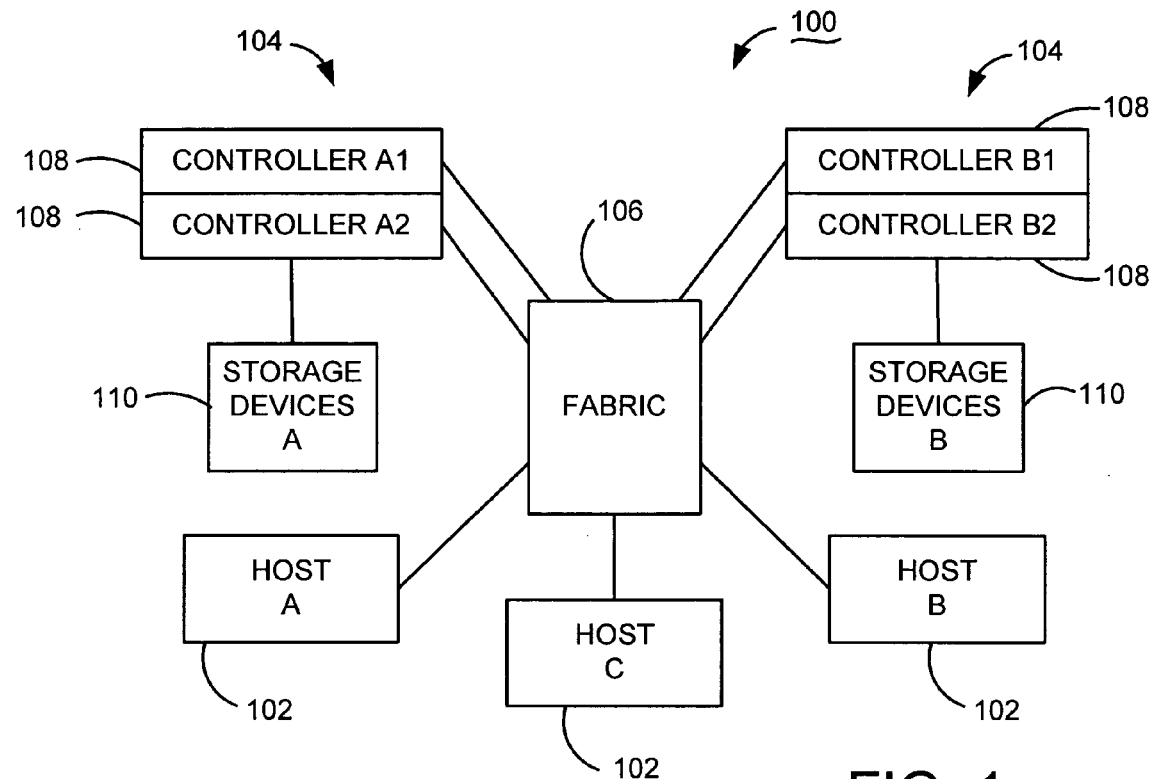
FIG. 1 is a top level functional block depiction of a computer-based system characterized as a wide-area network utilizing mass storage.

To illustrate an exemplary environment in which presently preferred embodiments of the present invention can be advantageously practiced, FIG. 1 shows a computer-based system 100 characterized as a wide area network (WAN) utilizing mass storage.

The system 100 includes a number of host computers 102, respectively identified as hosts A, B and C. The host computers 102 interact with each other as well as with a pair of data storage arrays 104 (denoted A and B, respectively) via a fabric 106. The fabric 106 is preferably characterized as a fibre-channel based switching network, although other configurations can be utilized as well including the Internet.

Each array 104 includes a pair of controllers 108 (denoted A1/A2 and B1, B2 respectively) and a set of data storage devices 110 preferably characterized as hard disc drives operated as a RAID (redundant array of independent discs). The controllers 108 and devices 110 preferably utilize a fault tolerant arrangement so that the various controllers 108 utilize parallel, redundant links and at least some of the user data stored by the system 100 is mirrored on both sets of devices 110.

It is further contemplated that the A host computer 102 and the A data storage array 104 are physically located at a first site, the B host computer 102 and B storage array 104 are physically located at a second site, and the C host computer 102 is at yet a third site, although such is merely illustrative and not limiting.

Figure 2:
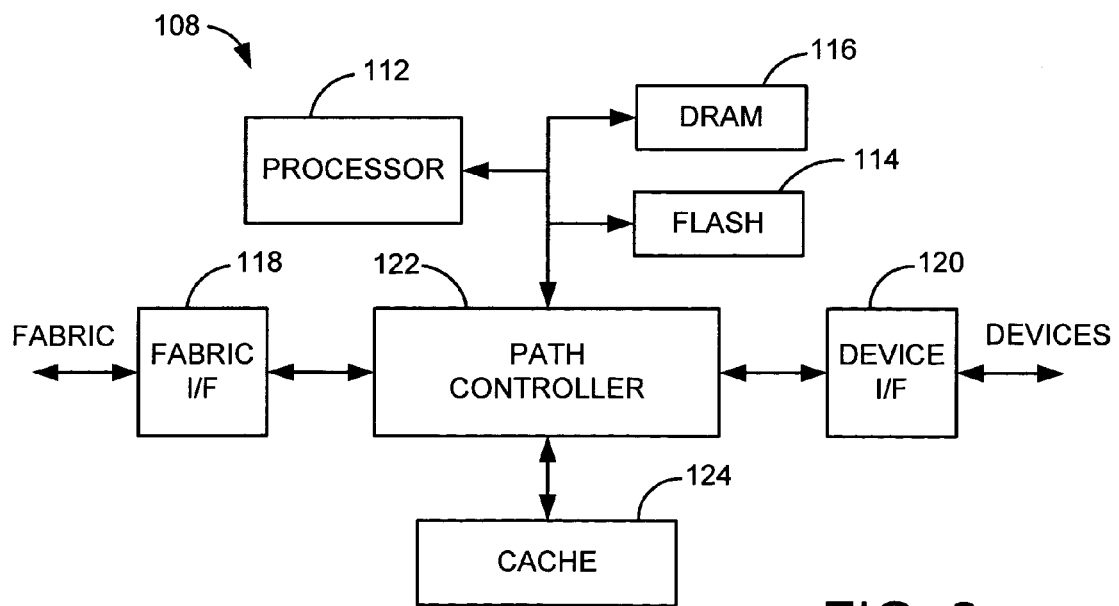
FIG. 2 provides a functional block diagram to illustrate a selected one of the controllers of FIG. 1.

FIG. 2 illustrates a selected one of the controllers 108 in greater detail. The controller 108 can be embodied in a single integrated circuit, or distributed among a number of discrete circuits as desired.

A main processor 112, preferably characterized as a programmable, general purpose computer processor, provides top level control in accordance with programming steps and processing data stored in non-volatile memory 114 (such as flash memory or similar) and in dynamic random access memory (DRAM) 116.

A fabric interface (I/F) circuit 118 communicates with the other controllers 108 and the host computers 102 via the fabric 106, and a device I/F circuit 120 communicates with the storage devices 110. The I/F circuits 118, 120 and a path controller 122 form a communication path to pass commands and data between the storage array and the host using cache memory 124.

Figure 3:
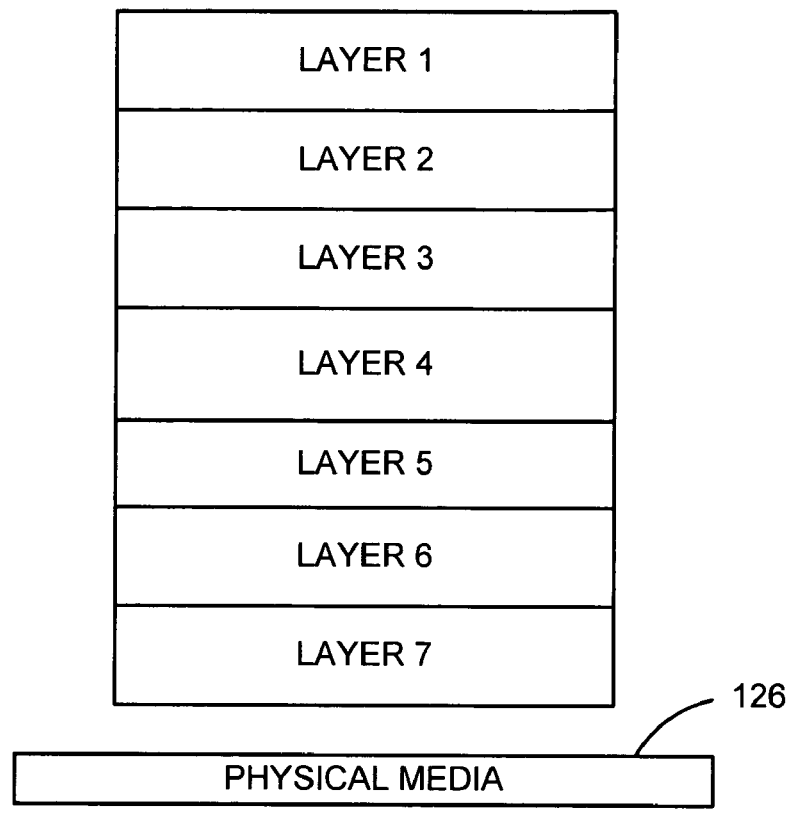
FIG. 3 illustrates a number of different software layers utilized by the system of FIG. 1.

FIG. 3 provides a generalized depiction of a preferred arrangement for software utilized by the system 100 of FIG. 1. In FIG. 3, the software is viewed as being arranged in a number of hierarchical layers (in this case Layer 1 through Layer 7), with Layer 1 representing a top-most layer in farthest proximity to physical media 126 of the devices 110, and Layer 7 representing a bottom-most layer most closely associated with the media 126. Other suitable arrangements can be used as desired, including different numbers and types of layers. For purposes of the present discussion, it is contemplated that Layers 1-3 generally represent application routines and operating systems utilized by the host computers 102, Layers 4-5 represent routines and modules at the controller 108 level, and layers 6-7 represent routines and modules at the device 110 level.

As will be recognized, a data transfer request from a selected host computer 102 to write data to the devices 110 will invoke one or more host level command processes. Such processes in turn invoke various other processes down and back up through the various layers to ultimately result in the completion of the desired task. Along the way, various system resources are allocated, utilized and released.

Figure 4:
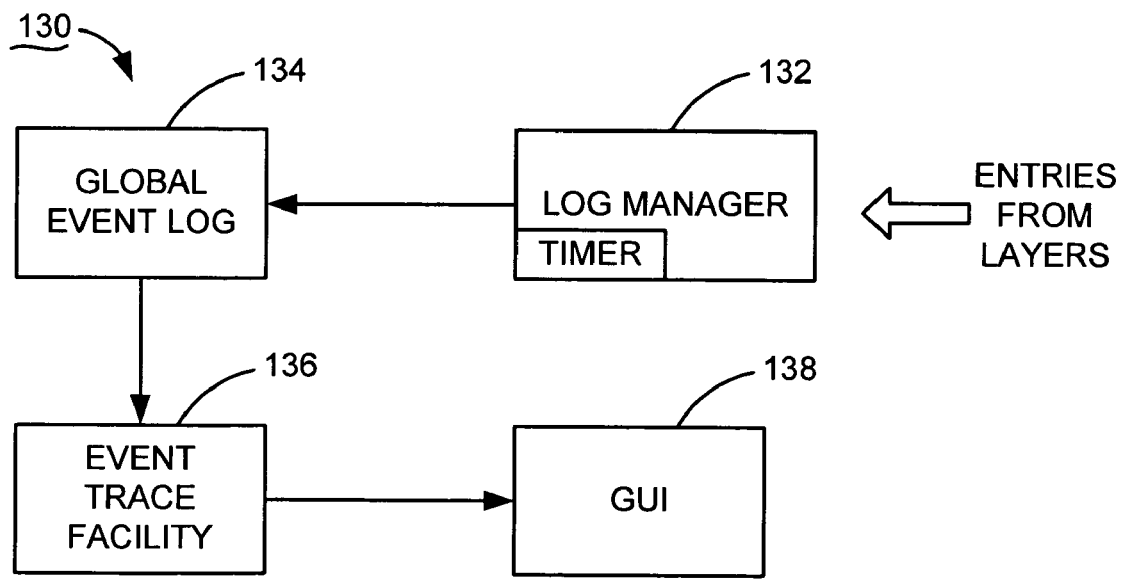
FIG. 4 provides a preferred arrangement for an event log and analysis module utilized by the software of FIG. 2.

FIG. 4 represents a preferred arrangement for an event log and analysis module 130 used to collect entries associated with each event carried out by the software of the system 100, at all levels, and then to generate a sequence of entries associated with a selected initiating process. The module 130 preferably includes a log manager block 132, a global event log 134, an event trace facility (ETF) 136 and a graphical user interface (GUI) 138. Each of these blocks will be discussed in greater detail below.

Figures 5, 6:
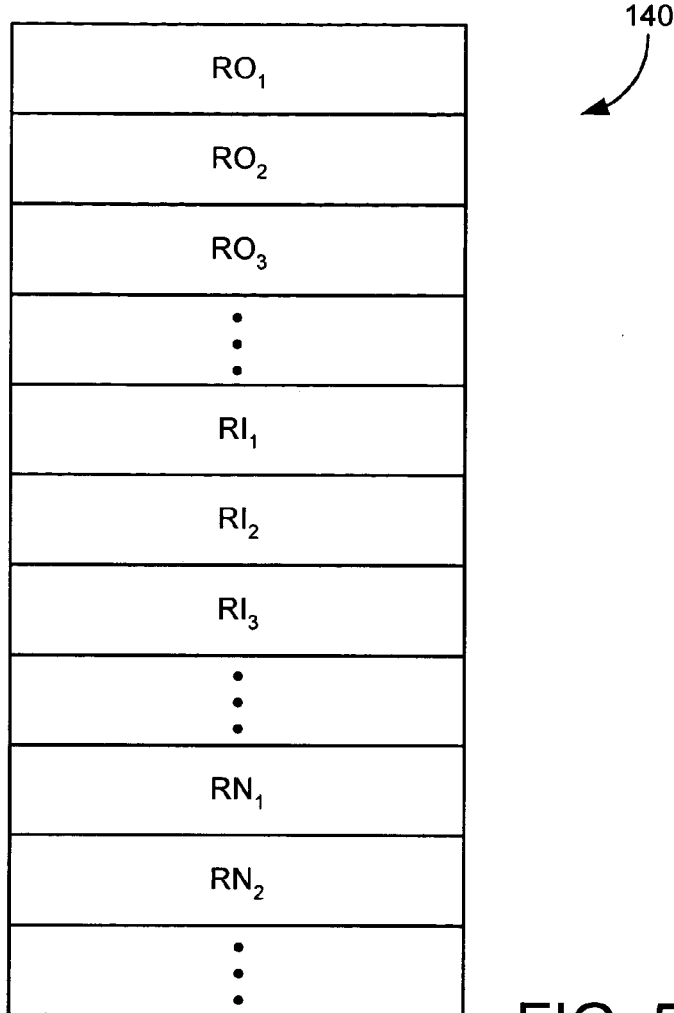
FIG. 5 shows a resource index stack to identify system resources available to the software of FIG. 2.
FIG. 6 depicts a generalized format for the global event log of FIG. 4.

FIG. 5 provides a resource index stack 140 to illustrate various types of system resources utilized by the system software. Because the formats and nomenclatures for the resources can vary widely depending upon the architecture of a given application, for simplicity the resources will be generically referred to as Resource 0 through Resource N. Resource 1, for example, can represent a host command request (HCR) which is used to identify various variables, values or attributes associated with a given host level command process, and so on.

During operation, a service request will generally allocate one or more of the resources to perform a desired operation, and may invoke or link to one or more lower level processes until the service request is completed. Preferably, upon the operation of every event, each of the software layers operates to provide an entry into the global event log 134, as depicted by FIG. 6. The log 134 is preferably written to a selected disc location on the media 126 and represents a sequential listing of all events carried out by the software.

The event entries include indexing information that identifies the initiating process (such as Process(1), Process(2), and Process(3) as generally identified in FIG. 6). Each event is broadly defined by the operation of a particular layer or module to obtain a result, such as the retrieval of or writing of data to a memory space, performing a calculation, linking to or delinking from another layer, etc. Preferably, all layers write to the same log and the log reflects all activity in a time-sequential manner.

The size of the log (i.e., the amount of memory allocated therefor) can be selectively varied by the log manager and by inputs from the user. A larger allocated space will track a greater history window, but will also consume greater system resources. It is contemplated that the log is preferably sized to reflect several hours of continued operation of the system 100. The log is further preferably characterized as a rolling window so that once the allocated log space is filled with entries, subsequent entries overwrite existing entries beginning with the oldest pending entries in the log. A timer 142 (FIG. 4) of the log manager 132 can also be used to set the time period for the collection and/or retention of the log entries.

Figure 7:
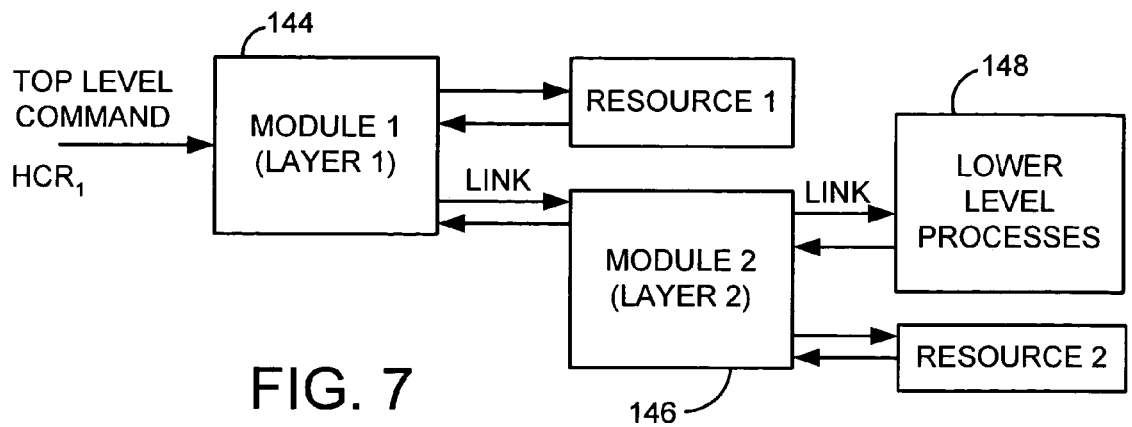
FIG. 7 generally illustrates a partial chain of events carried out in response to issuance of a top level host command request (HCR).

FIG. 7 represents initial operations carried out in response to a selected initiating process. For purposes of illustration, it is contemplated that this process is a top level command (HCR1) associated with the writing of user data by a selected host computer 102 to the devices 110.

As shown by FIG. 7, the top level command invokes the operation of a first module 144 in Layer 1 which allocates a first resource (Resource 1) and links to a second module 146 in Layer 2. The second module 146 allocates a second resource (Resource 2) and performs one or more additional links to lower level processes (denoted at 148). This process will continue until at some point the user data are transferred to cache memory 124 (FIG. 2), a write-back command is issued to the initiating host computer 102, the data are transferred to the appropriate physical media 126, and the responsible controller is notified that the data have been successfully written. It will be noted that the global event log 134 preferably captures all events relating to the service request, including events that are carried out after the top level process has been identified as being completed (as in, for example, the case of write-back data).

The log 134 can be updated in a real-time fashion, but process efficiencies can be generally obtained by caching, at either a layer level and/or at a device level, a short listing of the recent events which is then transferred to the log manager at an appropriate time. In this way, the global collection of event data as described herein can have a reduced, if not wholly transparent, effect upon system availability.

Figure 8:
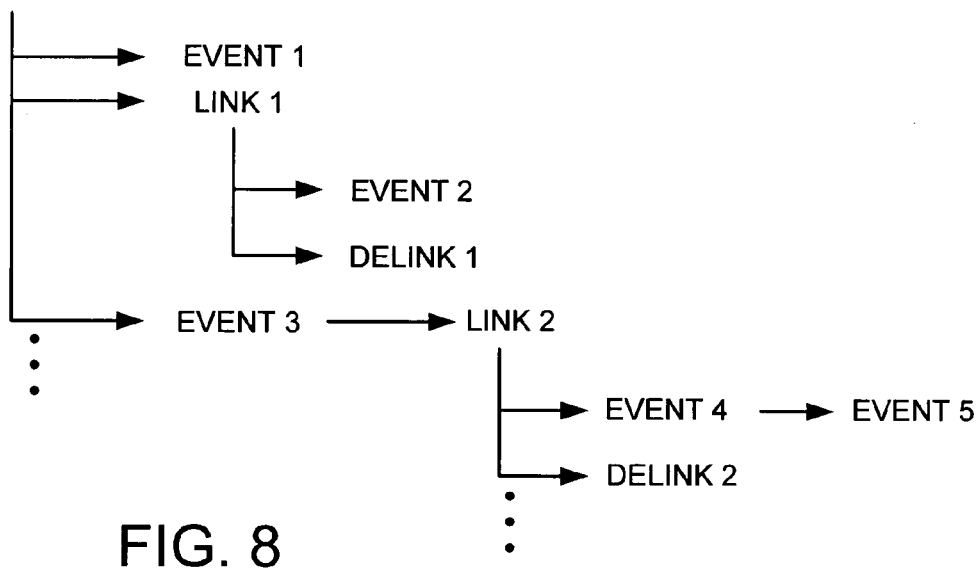
FIG. 8 represents an output of the event trace facility of FIG. 4 to track a particular process from the global data log of FIG. 6.

The event trace facility 136 of FIG. 4 preferably operates in response to manual user requests to poll the global event log 134 and retrieve all entries relating to a particular initiating process. The ETF 136 uses the addresses for link and delink events to expand and contract its search lists, thereby accounting for all of the events associated with the service request through the various layers. The resulting log data can be presented by the GUI 138 in any suitable fashion such as the tree diagram in FIG. 8 or in time sequence order to provide the sequence of events that resulted from the initial service request. It is contemplated that the GUI 138 is accessible via the host computers 102 using system administrator access, although other suitable arrangements including a dedicated computer can be utilized as well.

The event trace facility 136 can also be operated in an automated fashion in response to certain pre-set or user selectable occurrences, such as command timeouts, error conditions and the like, in order to provide an indication of system utilization in the moments leading up to such occurrences.

The global event log 134 is preferably physically arranged as a single structure, but in other preferred embodiments the log can be physically distributed among different locations so long as the log correctly reflects all of the entries associated with each event. The logging and analysis module 130 thus provides valuable information regarding system resource utilization during system design efforts as well as during field maintenance performance evaluation and failure analysis.

In view of the foregoing discussion, it will now be understood that preferred embodiments of the present invention are generally directed to a method and apparatus for logging and analyzing event flows associated with execution of a service request in a software system, such as a computer-based system (such as 100) comprising a multi-disc data storage array (such as 104).

Execution of the service request preferably results in a plurality of events carried out by multiple layers of the software system. A global event log (such as 134) accumulates a corresponding plurality of entries to associate each of the events carried out by the multiple layers.

An event trace facility (such as 136) preferably accesses the global event log to provide a sequence of the entries corresponding to the service request, such as in a tree structure displayed by a graphical user interface (such as 138). A log manager preferably controls operation of the global event log (such as 132).

Entries in the global event log are preferably entered sequentially for each ongoing process, and each entry preferably includes an identifier that identifies the associated service request.

For purposes of the appended claims, the recited "first means" will be understood to correspond to the disclosed module 130 of FIG. 4. Systems that provide localized logging of some events at certain layers without providing a centralized logging of all events associated with a particular service request fail to carry out the recited function and are excluded from the definition of an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed is:

1. An apparatus, comprising:
   a software system resident in a first memory space which concurrently executes respective first and second service requests; and
   a global event log resident in a second memory space which accumulates a first plurality of entries associated with the execution of the first service request and a second plurality of entries associated with the execution of the second service request, wherein the respective first and second pluralities of entries are entered sequentially and commingled within said log.

2. The apparatus of claim 1, further comprising an event trace facility configured to access the global event log to provide a sequence of the entries corresponding to at least a selected one of the first or second service requests.

3. The apparatus of claim 2, wherein the event trace facility is further automatically configured to provide the sequence of the entries corresponding to the selected service request in response to a selected occurrence within the software system.

4. The apparatus of claim 2, further comprising a graphical user interface which is configured to display a tree structure of the events associated with the selected service request to identify system resources utilized during said execution of the service request.

5. The apparatus of claim 1, wherein another at least one of the events comprises a corresponding delink event between the lower level layer back and the higher level layer to indicate completion of said link event.

6. The apparatus of claim 1, wherein each entry in the global event log comprises an identifier that identifies the associated service request.

7. The apparatus of claim 1, wherein the entries in the global event log include entries for events carried out associated with each service request after a process complete indication is returned to signify completion of said service request.

8. The apparatus of claim 1, further comprising a log manager which operates to control the global event log.

9. A method comprising steps of:
   accumulating in a global event log in a memory space a first plurality of entries associated with execution of a first service request by a software system; and
   accumulating a second plurality of entries in the global event log associated with a second service request executed during execution of the first service request, wherein the respective first and second pluralities of entries are entered sequentially and commingled within said log.

10. The method of claim 9, further comprising a step of subsequently accessing the global event log to extract a sequence of the entries corresponding to at least a selected one of the first or second service requests.

11. The method of claim 9, further comprising detecting an error condition in the software system, and accessing the entries in response to the detected error condition.

12. The method of claim 9, wherein at least one of said entries identifies a link event from a first layer to a second layer of the software system, wherein another at least one of said entries identifies a corresponding delink event from the second layer back to the first layer.

13. The method of claim 12, wherein the method further comprises extracting a sequence of the events associated with at least a selected one of the first or second service requests which includes said link and delink events.

14. The method of claim 9, wherein at least one of the events of the executing step comprises an operation using an allocatable system resource.

15. The method of claim 9, wherein the respective execution of the first and second service requests results in a plurality of events carried out by multiple layers of the software system, and wherein the respective first and second pluralities of entries in the global event log correspond to said plurality of events.

16. The method of claim 9, wherein at least a selected one of the first or second service requests comprises a host level user initiated request.

* * * * *